March 22, 1955     W. H. RANDALL     2,704,493
MOLDED PULP ARTICLES AND PROCESS OF MANUFACTURE
Original Filed Dec. 2, 1947
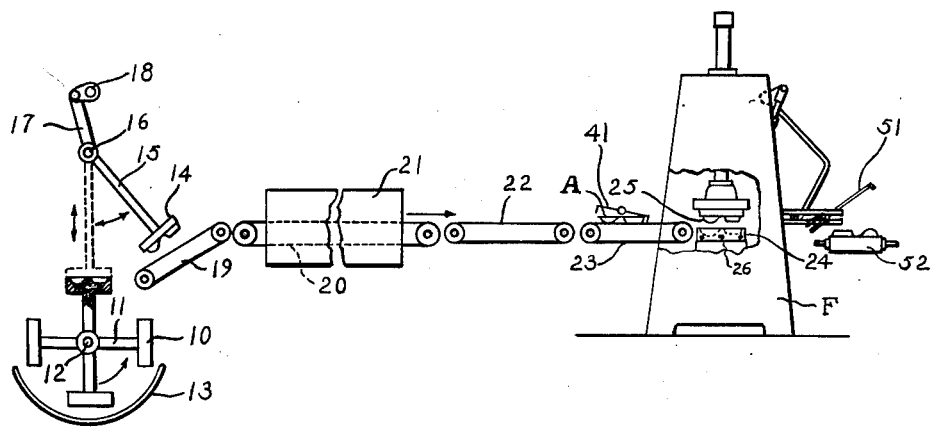
INVENTOR.
Walter H. Randall
BY
Arnold C. Rood
Attorney

United States Patent Office 2,704,493
Patented Mar. 22, 1955

2,704,493

MOLDED PULP ARTICLES AND PROCESS OF MANUFACTURE

Walter H. Randall, Waterville, Maine, assignor to Keyes Fibre Company, Portland, Maine, a corporation of Maine Original application December 2, 1947, Serial No. 789,167. Divided and this application June 27, 1949, Serial No. 101,599

5 Claims. (Cl. 92—54)

This invention relates to the art of pulp molding, and more particularly to an improved and economical process for preparing molded pulp articles of advantageous characteristics.

This is a division of my copending application Ser. No. 789,167, filed December 2, 1947, now abandoned.

While of general utility, this invention has particular applicability to the production of molded pulp articles which have cooperating contours or profiles which must accurately register with each other or with the contours of adjacent articles. Examples of such are the cartons or packs used in the transportation or packaging of small quantities of eggs, incandescent bulbs, radio tubes or other fragile objects. These cartons or packs usually consist of foldable sections, one or more of which is provided with article-receiving cavities spaced apart by separating posts.

When made of molded pulp, such cartons or packs must be capable of production in such manner as will enable them to compete with packing units now on the market made of other materials, such as cardboard or the like, in respect to cost, appearance, finish, and capacity to receive printing, and also in respect to the accurate registration of their contours or profiles when the complemental sections of the carton or pack are overfolded upon one another to form the container or when the articles are nested with one another for storage or for shipment in bulk.

In the past, there have been two general methods in use in the pulp molding industry for manufacturing, respectively, "rough-finished" articles, and "smooth-finished" articles.

Rough-finished articles, which are of the less expensive variety, have been molded on a high-speed molding machine and dried in an open dryer, that is to say, a dryer in which the articles are not under pressure, but are not allowed considerable latitude or freedom during drying. Such drying may be referred to as "free-drying" or "open-drying." Rough-finished articles have been and are being made in very large quantities, and the open dryer procedure employed in making such articles is highly economical, and makes possible large scale production of rough-finished articles at low cost. On the other hand while such "free-" or "open-drying" is effective and decidedly economical, warpage and distortion may take place, which in the case of certain articles of intricate shape seriously affects the marketability thereof.

"Smooth-finished" articles have been made by a more expensive process, wherein the molded articles are held under pressure and in complete restraint between complemental heated die members during the drying period, the die members being shaped to the exact contour of the molded article and thereby preventing any warpage or distortion of the article during drying. This process, which involves what may be termed "closed-drying", produces molded pulp articles of highly accurate dimensional character. The process however, is expensive and involves high costs for die equipment and maintenance. Furthermore, smooth-finished articles are dense, hard, boardy, and inferior in the cushioning and resilient qualities desired for containers for fragile objects.

As is well known in the art, rough-finished articles, due to their "free-drying," normally shrink to a small extent, which in any given case is dependent upon the characteristics of the particular pulp mixture employed. In the manufacture of smooth-finished articles as outlined above, on the other hand, by reason of the complete restraint under which the articles are held in complemental dies during the drying period, the articles are in effect dried under tension, thereby precluding the occurrence of shrinkage.

An object of the present invention is to provide an improved process of making molded pulp articles of predetermined precise conformation and smooth surface finish.

In accordance with the above and other objects, there is provided by this invention a process of making a molded pulp article of predetermined precise conformation and complex contour, wherein pulp fibres from an aqueous pulp slurry are felted into a wet pulp article of substantially the desired conformation. The wet article is then free-dried. Subsequently the article is pressed in the presence of heat to an extent only substantially sufficient to remove the warpage and distortion of the free-dried article and to impart thereto precise, permanent, predetermined conformation and complex contour and improve its surface finish, while still maintaining the integrity of the molded pulp structure and retaining essentially the cushioning characteristics of a free-dried molded pulp article.

Conveniently, the process may be carried out continuously by first suction-molding the articles on foraminous forming dies from an aqueous pulp mixture. The wet molded articles may then be free-dried by placing them on a conveyor moving through a tunnel type of heated dryer at a rate such that the articles are dry upon issue from the discharge end of the dryer. From the dryer, the articles each may be transferred to and disposed between a pair of complemental pressing or ironing dies of substantially the same shape as the forming dies. These pressing dies may be closed on the articles under heat and pressure to an extent only substantially sufficient to remove the warpage and distortion caused by drying, to impart a smoother surface finish to the articles, and to obtain the required dimensional accuracy and predetermined precise conformation of the articles, thus retaining also essentially the cushioning characteristics of the free-dried articles. Thereafter the articles may be removed from between the pressing dies.

The character of surface finish obtained on the pressed articles may be controlled in part by regulation of the moisture content in, or on the surface of, the article at the time of ironing or pressing. For a superior surface finish the surface of the article may be moistened as by spraying before pressing it, either over its entire surface, or in selected areas where the highest degree of finish is desired. For such moistening there may employed water, or water together with other ingredients. Thus, stiffening, sizing, coloring, or other moistening or filling ingredients may be incorporated in the moistening material. The moistening material, together with any such other ingredients as may be desired, may be applied to the articles in any suitable manner, such as by passing the articles under, above, or between sprays just before the articles are introduced between the pressing dies.

By the process of this invention, molded pulp articles may be produced of predetermined precise conformation and complex contour, and of uniform character. Furthermore, a smooth surface finish may be produced which not only greatly improves the overall appearance of the articles but also provides a greatly improved surface for printing and the like. The pressure exerted by the complementary dies on the articles contributes to the superior surface finish which may be obtained on articles prepared by the process of this invention. This pressure, of course, compacts the molded pulp substance of the articles to an extent dependent in part upon the amount of pressure. This compacting effect may be utilized if desired, to produce additional surface effects on the articles, such as, for example, embossings or folding creases.

Molded pulp articles prepared according to this invention have highly advantageous and indeed unique properties in that they exhibit generally the soft, resilient, and cushioning qualities of rough-finished molded pulp articles, together with the accuracy of dimension and superior surface finish exhibited by the more expensive smooth-finished, die-dried articles, but without the hardness and high sheet density which is characteristic of such smooth-finished articles and which makes them inferior as a protective packing for fragile articles.

In the drawing, the figure is a diagrammatic representation illustrating a preferred manner of carrying out the process of this invention. Thus, there is shown a machine of the intermittently rotating type in which foraminous female forming dies 10, mounted on hollow radial arms 11, are rotated step-by-step by shaft 12, through a pulp tank 13 for the suction formation of molded pulp articles on said dies. At each pause in the rotation of shaft 12 a formed article is removed from a forming die by means of a male transfer die 14 mounted on a hollow arm 15 carried by a shaft 16. Open-faced forming dies 10 and the transfer die 14 are provided with conventional air and vacuum connections for forming and transferring the articles.

Shaft 16 is operated from an eccentric 17 fast on a continuously rotating drive shaft 18, whereby shaft 16 and its transfer die 14 are reciprocated toward and away from the forming dies in time to the step by step rotation of said dies. As each forming die is paused in registration with the transfer die, said transfer die moves toward the forming die to accomplish transfer of the formed article to the transfer die, after which the transfer die is swung laterally, by any suitable cam or the like (not shown) to discharge the formed article onto a conveyor 19 which carries it to another conveyor 20 operating within an open dryer 21 of conventional construction. The formed articles may be supported in any suitable manner on the conveyor 20 during the drying operation.

In the open dryer 21 the articles are "free-dried," that is to say, they are allowed considerable latitude or freedom during drying, as distinguished from the previously mentioned expensive prior art process, wherein articles are held in complete restraint between complemental heated die members during the drying operation.

As illustrated, the dried articles A are discharged from the delivery end of the dryer onto a conveyor 22, preferably driven at a higher linear speed than dryer conveyor 20, and are deposited by conveyor 22 upon another conveyor 23, preferably driven at a higher linear speed than conveyor 22. Conveyor 23 carries the articles to one side of a press comprising a frame F on which is mounted a stationary female die 24, and an alined vertically reciprocating male die 25, either or both of which may be heated by any conventional heating means. As here shown, the female die is provided with steam passages 26 for heating the same.

Dies 24 and 25 are complemental to each other, and when closed on a dried and distorted article they restore the article to substantially its original molded shape and dimensions and improve its surface appearance. If desired, said dies may also be provided with means for producing additional surface effects on the articles, such, for example, as embossings or folding creases.

Prior to the admission of the article to said dies, water, stiffening, sizing, coloring or filling materials may be sprayed or otherwise applied to the article for incorporation therein while it is being pressed or ironed.

Means may be provided for opening and closing dies 24 and 25 at regular intervals, for admitting the dried and distorted articles singly between said dies while said dies are open, and for removing the reshaped articles from between said dies after they have closed upon it and again opened, and such operating mechanisms may be timed to one another so that the operation of the equipment will be fully automatic and will not require manual handling of the articles.

Thus, timed to the operation of the dies 24 and 25 is a gate 41 for controlling the passage of the dried articles A along conveyor 23. Gate 41 is shown as mounted above conveyor 23 adjacent to the inlet end thereof and operates to admit the articles one at a time between dies 24 and 25 after said dies have opened to discharge a pressed article.

Also timed to the operation of dies 24 and 25, as well as gate 41, is a transfer device 51 for automatically removing the pressed articles from between said dies. The device 51, as shown, is constructed to reciprocate horizontally in and out between the dies 24 and 25 while they are open, and, near the end of the withdrawal stroke, to pivot and discharge the pressed article onto a conveyor 52, by means of which the pressed articles are carried elsewhere, as for example, to a printer or a stacking and counting machine.

In the continuous process as specifically illustrated herein, it will be observed that the after-pressing dies are arranged to press or iron the dried articles substantially as rapidly as they are produced by the forming dies. It is well known that the time required to form an article on the conventional die illustrated is a matter of merely a few seconds. It will be seen therefore that the process is capable of very rapid production of articles of high quality.

It will be observed furthermore that the process is highly economical in character. Thus, the drying of the wet formed articles may be carried out in dryers of simple construction as compared with the expensive prior art production of smooth-finished articles wherein the articles are contained and restrained in expensive complemental heated dies for the duration of the drying period.

While the process has been specifically illustrated as a continuous process wherein the articles have moved directly to the after pressing dies from the dryer, it will be understood that the wet formed articles may be dried in any other suitable manner, or may be stored subsequent to drying and prior to being pressed or ironed in the after-pressing operation.

It will further be noted that not only is the process of this invention economical and advantageous in other respects, but there may be produced by this invention large numbers of articles of identical, as well as precise, contour and shape.

I claim:

1. A process for making molded pulp unitary folding cartons for fragile articles, said process comprising the steps of suction molding from an aqueous slurry consisting essentially of fibers and water, wet pulp masses of substantially the configuration of the desired carton, free drying the molded masses on a generally flat support, and pressing the dried articles in the presence of heat and moisture between pressing dies having the configuration of the desired carton, the pressing being to an extent only sufficient to remove the warpage and distortion of the inexpensive free drying, impart predetermined precise conformation and contour to the pressed articles so that they fold into accurately mating sections, and provide an improved surface finish while retaining the cushioning characteristics of the free drying.

2. The process of claim 1 in which the pressing step has a duration substantially equal to that of the molding step.

3. A process for making molded pulp unitary egg cartons having foldable sections at least one of which is provided with article-receiving cavities spaced apart by separating posts, said process comprising the steps of suction molding from an aqueous slurry consisting essentially of fibers and water, wet pulp masses of substantially the configuration of the desired carton, free drying the molded masses on an open flat support, and pressing the dried articles in the presence of heat and moisture between pressing dies having the configuration of the desired carton, the pressing being to an extent only sufficient to remove the warpage and distortion of the inexpensive free drying, impart predetermined precise conformation and contour to the pressed articles so that they fold into accurately mating sections, and provide an improved surface finish while retaining the cushioning characteristics of the free drying.

4. A molded pulp, multi-section, unitary, accurately foldable carton, at least one section of which has pockets to hold fragile articles, the walls of the carton having interiors of the rough-finished type produced by suction molding from an aqueous slurry consisting essentially of fibers and water, and free-drying the molded masses on a generally flat support, the surfaces of the walls being denser and of the smooth-finished type produced by pressing said free-dried masses in the presence of heat and moisture between pressing dies having the configuration of the desired carton, said walls providing an overall cushioning effect of the resilient, rough-finished type while, at the same time, providing relatively smooth surfaces of pleasing appearance and suitable for printing.

5. A molded pulp, multi-section, unitary, accurately foldable egg carton, at least one section of which has egg receiving pockets, spaced apart by separating posts, the walls of the carton having interiors of the rough-finished type produced by suction molding from an aqueous slurry consisting essentially of fibers and water, and free-drying the molded masses on a generally flat support, the surfaces of the walls being denser and of the smooth-finished type produced by pressing said free-dried masses in the presence of heat and moisture between pressing dies having the configuration of the desired carton, said walls providing an overall cushioning effect of the resilient, rough-finished type while, at the same time, providing relatively smooth surfaces of pleasing appearance and suitable for printing.

References Cited in the file of this patent

UNITED STATES PATENTS

| Number | Name | Date |
|---|---|---|
| 1,266,449 | Fulcher | May 14, 1918 |
| 1,598,260 | Sutherland | Aug. 31, 1926 |
| 1,599,384 | O'Brien | Sept. 7, 1926 |
| 1,694,627 | Robinson | Dec. 11, 1928 |
| 1,884,366 | Sutherland | Oct. 25, 1932 |
| 2,016,568 | Zinser | Oct. 8, 1935 |
| 2,023,200 | Huff et al. | Dec. 3, 1935 |
| 2,237,048 | Carter | Apr. 1, 1941 |
| 2,274,095 | Sawyer | Feb. 24, 1942 |
| 2,317,394 | Mason | Apr. 27, 1943 |
| 2,337,581 | Wiley | Dec. 28, 1943 |
| 2,369,488 | Perry | Feb. 13, 1945 |

FOREIGN PATENTS

| Number | Country | Date |
|---|---|---|
| 419,807 | Great Britain | Aug. 23, 1933 |